United States Patent
Lindberg et al.

[11] Patent Number: 5,831,843
[45] Date of Patent: Nov. 3, 1998

[54] PULSE WIDTH MODULATION DEVICE FOR CONVERTING DIRECT VOLTAGE INTO A THREE-PHASE ALTERNATING VOLTAGE

[75] Inventors: Anders Lindberg, Stockholm; Rolf Pålsson, Saxdalen, both of Sweden

[73] Assignee: Asea Brown Boveri AB, Vasteras, Sweden

[21] Appl. No.: 939,009

[22] Filed: Sep. 26, 1997

[30] Foreign Application Priority Data

Mar. 24, 1997 [SE] Sweden .................................. 9701062

[51] Int. Cl.⁶ ...................................................... H02M 1/12
[52] U.S. Cl. ................................................ 363/41; 363/98
[58] Field of Search .................................. 363/35, 36, 37, 363/40, 41, 43, 95, 97, 98, 131, 132

[56] References Cited

U.S. PATENT DOCUMENTS

| | | | |
|---|---|---|---|
| 3,875,496 | 4/1975 | Carsten ...................................... | 363/97 |
| 4,218,732 | 8/1980 | Lafuze ...................................... | 363/160 |
| 4,870,557 | 9/1989 | Stacey ...................................... | 363/40 |
| 4,941,079 | 7/1990 | Ooi .......................................... | 363/132 |
| 5,068,999 | 12/1991 | Ito .............................................. | 363/97 |
| 5,615,099 | 3/1997 | Nakazawa .............................. | 363/41 X |

FOREIGN PATENT DOCUMENTS

WO 96/09678  3/1996  WIPO .

OTHER PUBLICATIONS

Lindberg, A., "PWM and Control of Two and Three Level High Power Voltage Source Converters, " Kungliga Tekniska Högskolan, Stockholm, 1995.

*Primary Examiner*—Peter S. Wong
*Assistant Examiner*—Y. J. Han
*Attorney, Agent, or Firm*—Pollack, Vande Sande & Priddy

[57] ABSTRACT

A device for converting direct voltage into a three phase alternating voltage having a two level converter connected to a direct voltage network and to an alternating voltage network. A control apparatus for performing pulse width modulation determines the pulse width modulation pattern for each phase by comparing a triangular wave for each phase with a reference alternating voltage. The triangular wave is inverted an even number of times during a fundamental oscillation of the reference alternating voltage and the time position of the inversions of each triangular wave is always such that two triangular waves are half a period displaced with respect to the third.

9 Claims, 9 Drawing Sheets

PULSE WIDTH MODULATION DEVICE FOR CONVERTING DIRECT VOLTAGE INTO A THREE-PHASE ALTERNATING VOLTAGE

BACKGROUND OF THE INVENTION

The present invention relates to a device for converting direct voltage into a three-phase alternating voltage. A two level VSC-converter is connected to a direct voltage network and an alternating voltage network, as well as to an apparatus to control the converter based on a reference alternating voltage. A pulse width modulation pattern is generated specific for each phase of the alternating voltage network. The width of the pulses are determined by the intersection points between the reference alternating voltage for the respective phase and a triangular wave specific for that phase. The triangular wave has an amplitude substantially half the direct voltage between the two poles of the direct voltage network, and a frequency which is a multiple of the frequency of the reference alternating voltage. For each phase, pulses having a duration between two consecutive intersection points, and an amplitude of substantially half the direct voltage (having a positive polarity if the reference alternating voltage is located above the triangular wave and negative polarity if below), are delivered at the alternating voltage side of the converter.

Such devices may be used in all types of situations, where a direct voltage has to be converted into a three-phase alternating voltage and may be used for reactive power compensation and in HVDC-plants (High Voltage Direct Current). In order to illustrate the invention, but not in any way limiting the invention, the specific application of such a device for HVDC will be described.

A plant in which a device of the type mentioned above is included has recently become known through the thesis "PWM and Control of Two and Three Level High Power Voltage Source Converters" by Anders Lindberg, Kungliga Tekniska Högskolan, Stockholm, 1995. Converter values are implemented using IGBTs (Insulated Gate Bipolar Transistor=bipolar transistor having an insulated gate) or GTOs (Gate Turn-off Thyristor) connected in series since they may easily be turned on and turned off simultaneously. VSC—(Voltage Source Converter) converters for forced commutation have been used for transmitting electric power between a direct voltage network for High Voltage Direct Current and an alternating voltage network.

It is well known that such a voltage constant, two level converter generates harmonics of three different types: plus, minus and zero sequence. It is not a problem to filter out the plus and minus sequences by means of harmonic filters connected to a HVDC-station. However, the zero sequence harmonics constitute a bigger problem, since the combination two level converter and three phase alternating voltage results in a total output voltage of the pulses at the direct voltage side of the converter never being zero. This produces a zero sequence voltage, which gives rise to a zero sequence current which is carried through the inductors of a HVDC-station without a transformer, to an alternating voltage filter, and back to capacitors located on the direct voltage side. The midpoint is grounded so as to prevent a propagation of zero sequence currents from one station to another of the direct voltage network. In devices of the type described the generated zero sequence current is high and unnecessarily produces high stresses on a converter station in which the device is included. A conceivable solution consists in installing particular zero sequence filters to reduce the zero sequence current, but this increases the costs considerably, which contradicts the object of replacing transformers by inductors to lower costs.

BRIEF SUMMARY OF THE INVENTION

The object of the present invention is to provide a device for use in a HVDC installation to reduce to a large extent the generation of zero sequence currents.

This object is according to the invention obtained by control apparatus of a converter for determining the pulse width modulation pattern for each phase of alternating voltage. A triangular wave having the same fundamental frequency as the triangular waves of the other phases is inverted an even number of times during a cycle of a reference alternating voltage, and locates the inversion instants for each triangular wave so that two triangular waves are displaced half a period with respect to a third.

Accordingly, the control apparatus produces a pulse width modulation method modified with respect to the pulse width modulation methods already known, such as sinusoidal PWM. One and the same triangular wave is normally used for all the three phases, which results in the use of so-called zero vectors at each turning point of the triangular wave for producing pulses supplied to the alternating voltage side, synchronized with the alternating voltage network. A zero vector means that all alternating current phases connected to the converter are connected to the same direct voltage potential, and these vectors generates therefor a high zero sequence voltage. By using different triangular waves for each phase according to the invention, and carrying out the inversion, no zero vectors will be used by the converter when the voltage time area is calculated, but only vectors having an amplitude being a third of the zero vectors. The zero vectors are in practice replaced by vectors preventing a vector which "is not moving", but instead moves forward and backward in time. It is necessary for a maintained periodicity to carry out an even number of inversions per fundamental oscillation. Accordingly, inversion is interpreted as an instantaneous reversion of the phase of the triangular wave in question, i.e., it is phase displaced by 180°, so that a peak value is converted to a valley value, or conversely, a valley value is converted to a peak value.

In the case of a HVDC-station it is possible to use two level converters without any transformers and without any costly zero sequence filters. It would also be possible in the case of not having any transformer to manage without any zero sequence filters when using three level converters, i.e., a NPC-bridge, in which zero sequences may be illuminated, but such a converter is more complicated than a two-level converter. In that event the dominant harmonics in a device according to the invention will be the plus and minus sequence components, which will be slightly higher than in conventional pulse width modulation, and there will then be slightly higher demands on the alternating voltage filters. However, the zero sequence components will be very small with the use of the device according to the invention, and the dominating zero sequence components are of a higher order. Since the zero sequence current generated is primarily determined by inductive elements, a high order means that the resulting zero sequence current will be much lower than is produced by the prior art devices.

According to a preferred embodiment of the invention, the control apparatus for the respective phase produces inversions of the triangular wave at substantially uniform time intervals. This advantageously avoids disturbances, such as addition harmonics or resonance phenomena for the alternating voltage as a consequence of the inversions.

According to another preferred embodiment of the invention the control apparatus generates the inversions so that the time interval between an inversion of one phase and the next inversion of any of the other phases is substantially constant minimizing the risk of disturbances to the alternating voltage as a consequence of the inversions. In the case of two inversions within a cycle of the fundamental oscillation frequency of the reference voltage, this causes each inversion to be phase displaced by 60° with respect to the inversions of the other phase. Thus, the inversion instants are of importance for maintaining symmetry.

According to another preferred embodiment of the invention the control apparatus for the respective phase inverts at least at the turning points of the reference alternating voltage for this phase which advantageously avoids the creation of zero vectors.

According to another preferred embodiment of the invention the control apparatus generates inversions two times per fundamental oscillation period of the reference voltage for each phase. Two inversions per period is a minimum, and an even higher number of inversions is conceivable, but this would mean that the fundamental frequency of the triangular waves being too high, this would lead to increased switching losses. It is therefore advantageous to invert the triangular wave for each phase two times per fundamental oscillation period to keep switching losses to a low level.

According to another preferred embodiment of the invention the control apparatus generates the inversion for a phase when the reference alternating voltages of the two other phases intersect each other or immediately thereafter. "Immediately thereafter" means that the inversion takes place after the intersection but considerably closer to the intersection than the next intersection. It turns out that this criteria avoids the creation of the undesirable zero vectors.

According another preferred embodiment of the invention the device converts direct voltage into alternating voltage in a power station of a plant transmitting electric power through a direct voltage HVDC network. A device of the type according to the invention has particular advantages when it is used in a station of such a plant.

Further advantages as well as advantageous features of the invention will appear from the following description as well as the claims.

DETAILED DESCRIPTION OF THE INVENTION

Figure 1A:
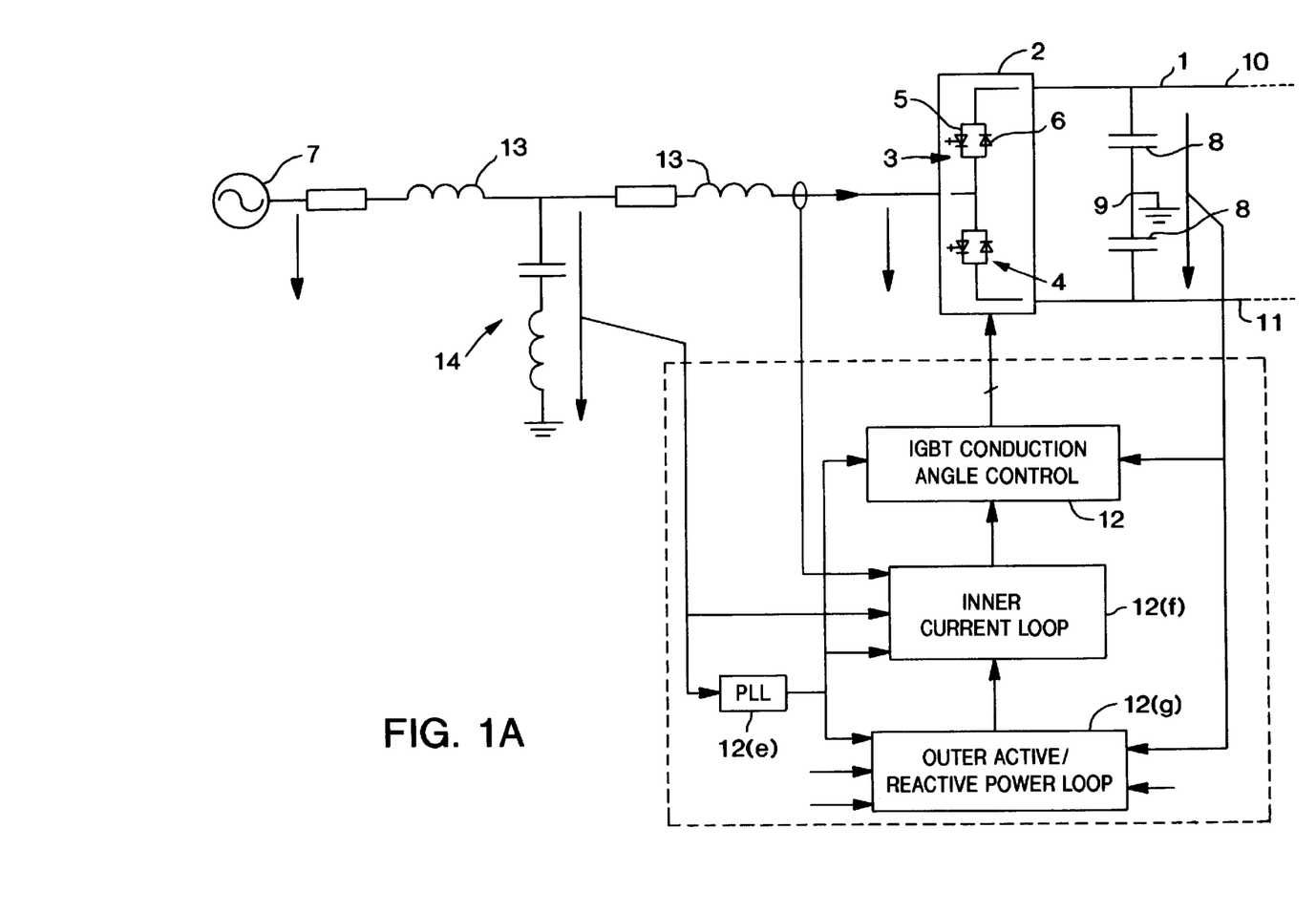
FIG. 1A illustrates a voltage-constant forced commutated two level converter connected to an alternating voltage network through inductors.
Figure 1B:
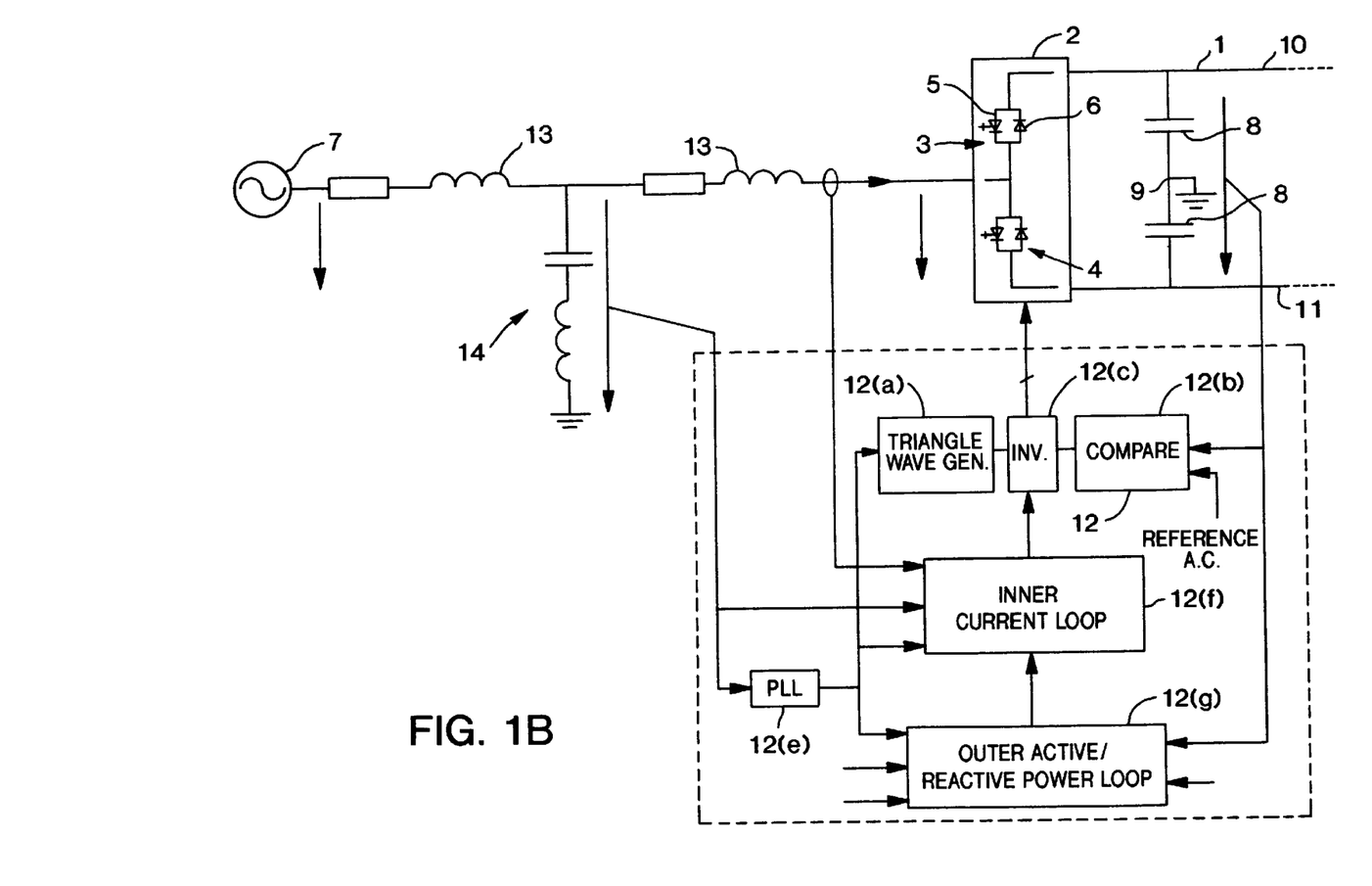
FIG. 1B illustrates the two-level converter of FIG. 1A modified in accordance with a preferred embodiment of the invention.

A converter station without transformers in a plant for transmitting electric power through a direct voltage HVDC network 1 is illustrated in FIG. 1. This station has at least one VSC-converter 2, which has conventional current valves 3, 4 in the form of turn-on and turn-off type semiconductor switches 5, such as IGBTs, connected anti-parallel to a freewheeling diode 6. Although only one IGBT is shown for each valve, this may represent a plurality of IGBTs connected in series and simultaneously controlled. Only the connection of the converter 2 to one phase of an alternating voltage network 7 is shown in the figure, but the converter is in practice connected to the three different phases of the alternating voltage network through respective current valves. For preventing zero sequence currents from propagating from one station to another station, the capacitor 8 of the direct voltage side is grounded at the junction 9. Pulses having an amplitude of half the direct voltage between two poles 10, 11 of the direct voltage network 1 may, in this way, be delivered to a respective phase of the alternating voltage network 7 through appropriate control of the converter 2. Apparatus 12 controls the converter 2 by sending turn-on pulses to the IGBTs of the converter. A conventional inner current loop 12(f) and outer loop 12(g) combine to provide a feedback signal to apparatus 12, from a PLL 12(e). The apparatus regulates the converter considering the magnitude of the direct voltage of the direct voltage network, the demands on consumption of the reactive power, the active power fed in by the alternating voltage network, or demanded thereby, etc. Current and voltage may be measured through a so-called sampling process so that the reference voltage may be calculated and the pulse width modulation pattern determined.

The converter of FIG. 1 is connected to the alternating voltage network through inductors 13, i.e., without any transformer, and a harmonic filter 14 is connected to the alternating voltage network to remove troublesome harmonics in the form of plus and minus sequences.

Figure 2:
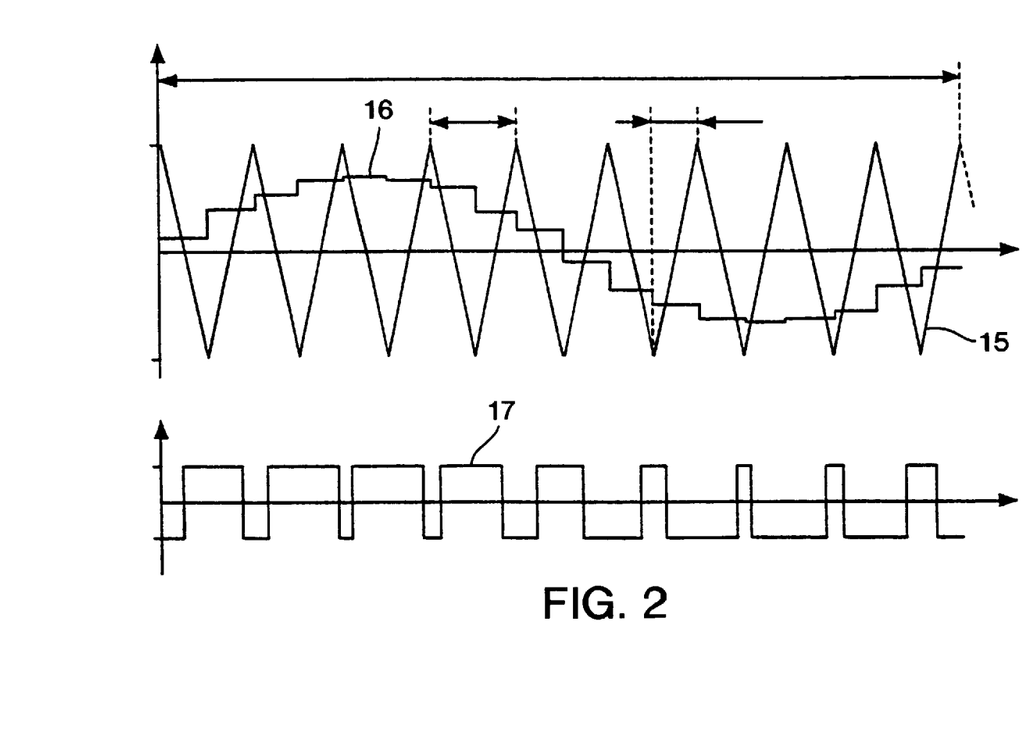
FIG. 2 illustrates the principle of conventional sinusoidal pulse width modulation.

For one of the phases of the alternating voltage network 7, FIG. 2 illustrates how sinusoidal-PWM is carried out. An imaginary triangular wave 15 having an amplitude of substantially half the direct voltage between the poles of the pulse width modulation network, and a frequency a multiple of nine times the frequency of the alternating voltage is superimposed over a reference alternating voltage 16. The same triangular wave is superimposed on the reference alternating voltage for each of the phases, and reference alternating voltages for the different phases are displaced by 120 electrical degrees with respect to each other. The apparatus 12 controls the converter to emit pulses 17 for each phase having a duration defined by two consecutive intersection points of the triangular wave and the reference alternating voltage. These pulses are positive when the reference alternating voltage is greater than the triangular wave, and negative when the reference alternating voltage is less than the triangular wave. The relationship between the frequency of the triangular wave and the fundamental frequency of the reference alternating voltage is defined as the pulse number p. The harmonics dominating in the phase voltages realized by this sinusoidal-PWM method are of the following order and type:

p−2: plus sequence, p: zero sequence, p+2; minus sequence, 2p−3: zero sequence, 2p−1:minus sequence, 2p+1: plus sequence and 2p+3: zero sequence.

It is primarily zero sequences that are a problem. The zero sequence voltage is defined as the sum of the voltages of the pulses of the three phases in a given moment divided by 3, which means that it may never be 0. This zero sequence voltage will give rise to a zero sequence current forming a closed loop through the inductors 13, through the alternating voltage filter 14, and back through the direct voltage capacitors 8. The zero sequence current generated becomes high, which gives rise to unnecessary high stresses on the converter station, and requires expensive zero sequence filters.

Figure 3:
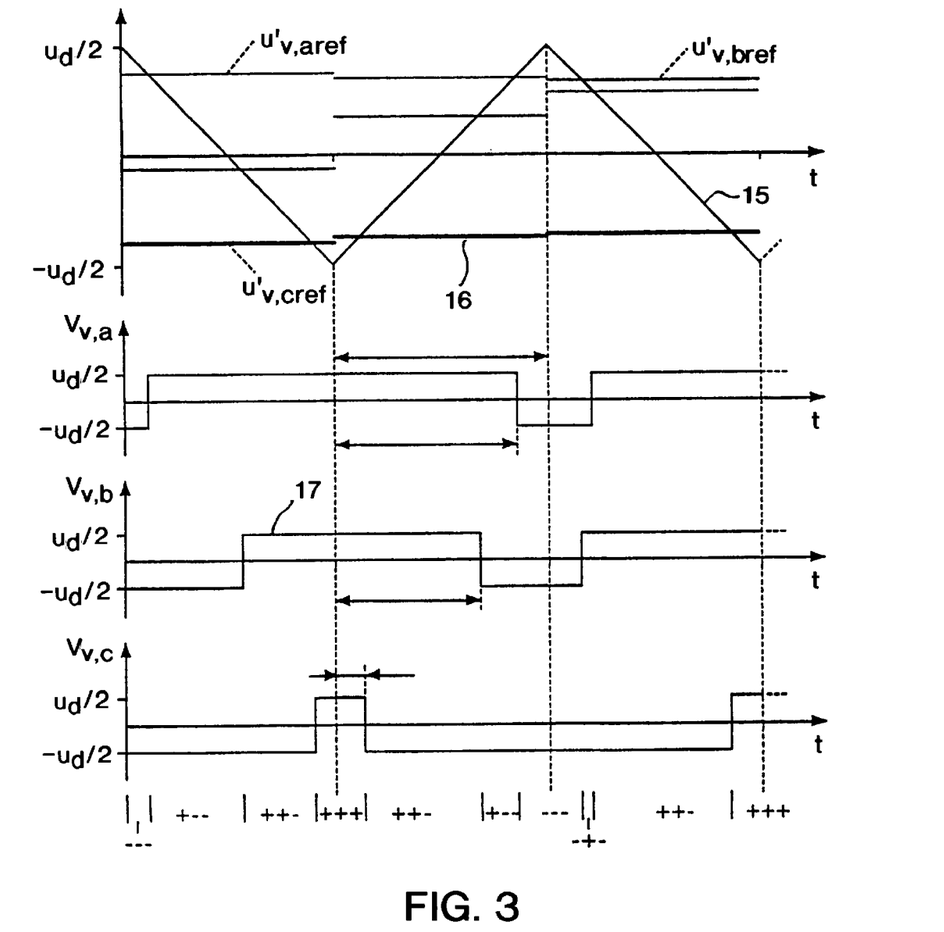
FIG. 3 illustrates conventional sinusoidal pulse width modulation for a three phase alternating voltage.
Figure 4:
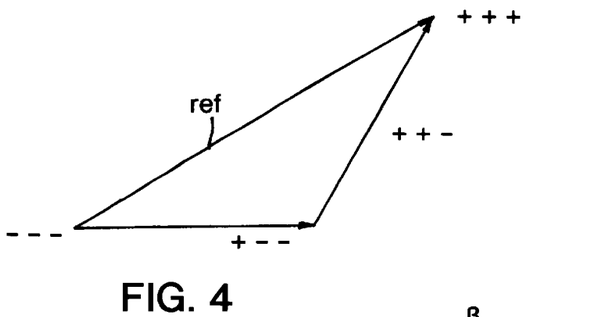
FIG. 4 is a view in the $\alpha\beta$-plane of a vector sequence according to the modulation pattern in FIG. 3.

FIG. 3 illustrates how the pulse width modulation according to FIG. 2 gives rise to different voltage vectors composed by the pulses of the three phases at different points of time. The symbol "+" indicates that the voltage pulse has a value of the direct voltage between the poles of the direct voltage network $u_d$ divided by 2, and a "−" a value of $-u_d/2$. It appears that in the beginning and at the end of the respective straight portion of the triangular wave, so-called zero vectors are formed, i.e., all the alternating current phases are connected to the same direct voltage potential. These zero vectors, used for keeping the pulse generation synchronized with the alternating voltage network, result in a zero sequence voltage three times as high as other vectors and a high zero sequence current having the mentioned negative consequences. FIG. 4 illustrates in the αβ-plane how a given voltage time area is obtained through the vector sequence: −−−, +−−, ++− and +++.

Figure 5:
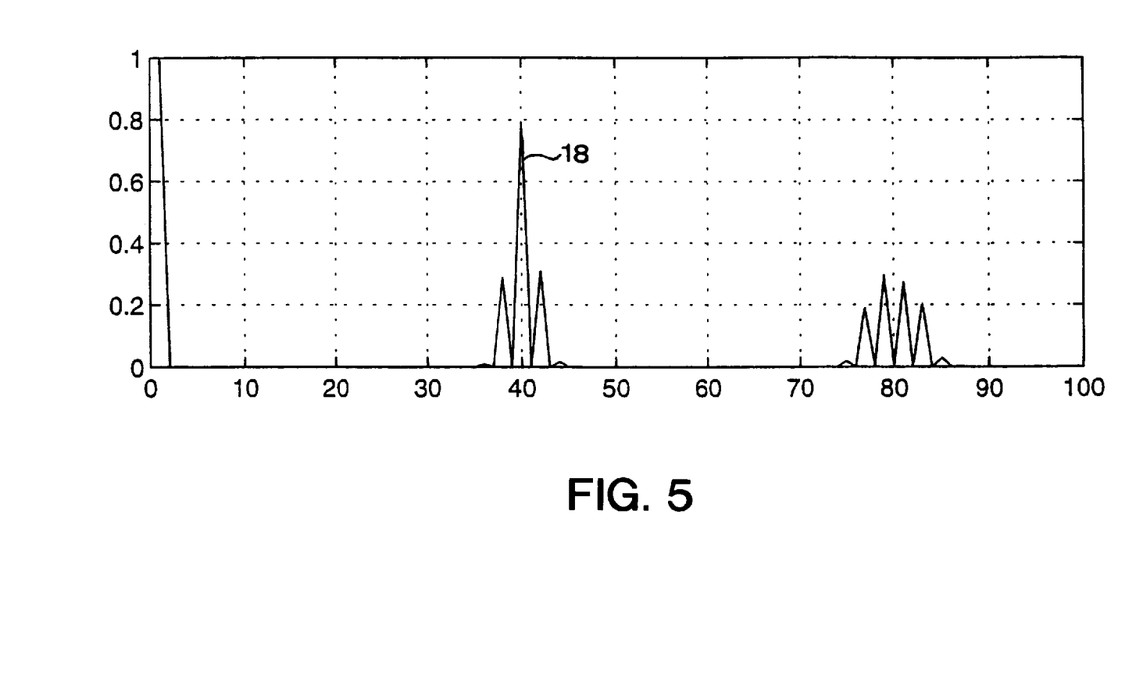
FIG. 5 is a graph illustrating harmonics created from pulse width modulation according to FIG. 3.
Figure 6A:
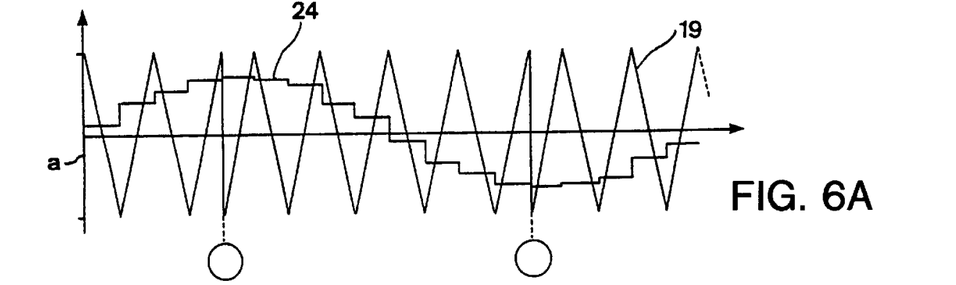
FIG. 6 is a view illustrating the principles of pulse width modulation generated by a device according to a preferred embodiment of the invention.
Figure 6B:
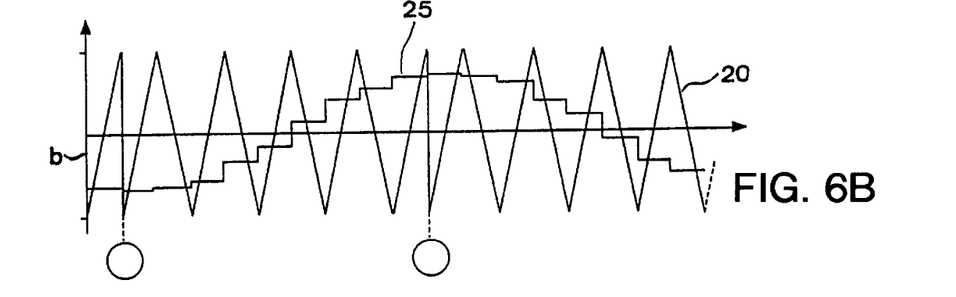
Figure 6C:
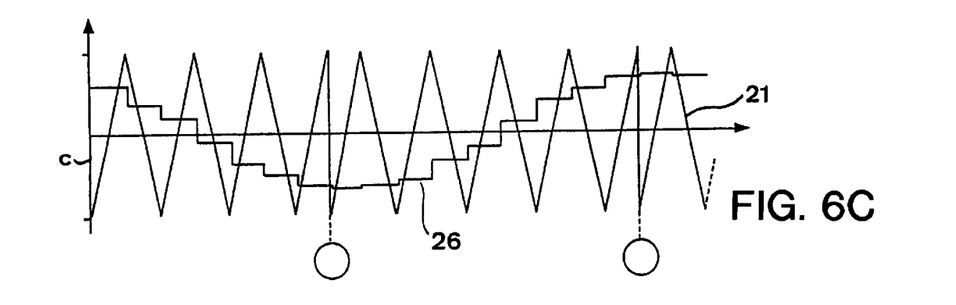
Figure 6D:
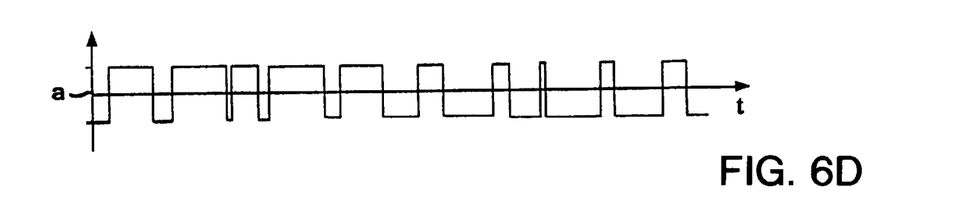

The magnitude of the different pulse sequences at p=40 is illustrated in FIG. 5, with p preferably at least as high as 10. It appears that the zero sequence voltage 18 at p is very high and accordingly gives rise to a high zero sequence current.

DETAILED DESCRIPTION OF A PREFERRED EMBODIMENT OF THE INVENTION

FIG. 6 illustrates how the control apparatus 12 of a device according to a preferred embodiment of the invention controls the two level converter 2. It should be noted that control of a two level converter is not restricted to the one example illustrated in FIG. 1B, although that example will hereinafter be discussed. The control apparatus utilizes one triangular wave 19, 20, 21 for each phase a, b, c of the reference alternating voltage 24–26 in which the different triangular waves generated in 12(a) have the same fundamental frequency. Each of the triangular waves are inverted two times by inverters 12(c) during a fundamental oscillation frequency of the reference alternating voltage, in which the inversion instants for each triangular wave are so located in time that two triangular waves are always half a period displaced with respect to a third and compared in 12(b) to a reference voltage. More exactly the time interval between an inversion of one phase and the next inversion of any of the other phases is substantially constant, which means that the distance between such inversions is substantially 60°. The inversions take place at turning points of the triangular wave and at turning points of the reference alternating voltage for the particular phase. More exactly, the triangular waves change phase position according to the following:

$u_{v,bref} > u_{v,cref}$: triangular wave in phase a is inverted $u_{v,bref} \leq u_{v,cref}$: triangular wave in phase a is inverted back $u_{v,cref} > u_{v,aref}$: triangular wave in phase b is inverted $u_{v,cref} \leq u_{v,aref}$: triangular wave in phase b is inverted back $u_{v,aref} > u_{v,bref}$: triangular wave in phase c is inverted $u_{v,aref} \leq u_{v,bref}$: triangular wave in phase c is inverted back.

The pulse width modulation pattern for the upper alternating voltage phase a is illustrated in the bottom of the figure.

Through the additional commutations shown as "0" caused by the inversions of the triangular waves, for different triangular waves for the different phases, the zero vectors disappear and only vectors having a third of the amplitude thereof are present.

Figure 7:
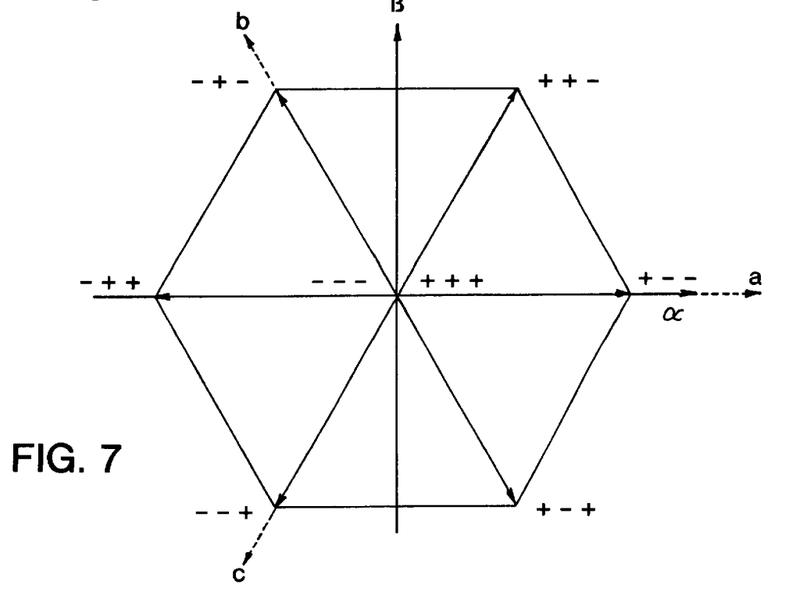
FIG. 7 is a view of the so-called $\alpha\beta$-plane, which is used to explain the principles of the present invention.

The so called αβ-plane is illustrated in FIG. 7, which shows which vectors may be realized by a two level converter. The figure has been divided into six sectors and, depending upon in which sector the reference alternating voltage vector is located, the following switching sequences may be used during each sampling interval through the device according to the invention:

Sector 1: "+−+"→"+−−"→"++−"→"−+−" or conversely

Sector 2: "+−−"→"++−"→"−+−"→"−++" or conversely

Sector 3: "++−"→"−+−"→"−++"→"−−+" or conversely

Sector 4: "−+−"→"−++"→"−−+"→"+−+" or conversely

Sector 5: "−++"→"−−+"→"+−+"→"+−−" or conversely

Sector 6: "−−+"→"+−+"→"+−−"→"++−" or conversely.

Figure 8:
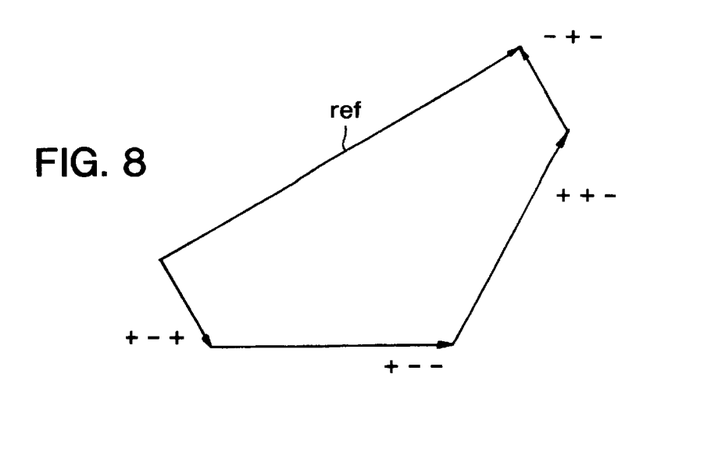
FIG. 8 is a view corresponding to FIG. 4 for the pulse width modulation according to FIG. 6.

It should be noticed that no zero vectors are used, but instead two other oppositely directed vectors are used for each sector, so that it is not standing still close to the turning points of the triangular waves, but it is instead moved forward and backward for synchronizing with the network. This is illustrated for the sector 1 in FIG. 8.

Figure 9:
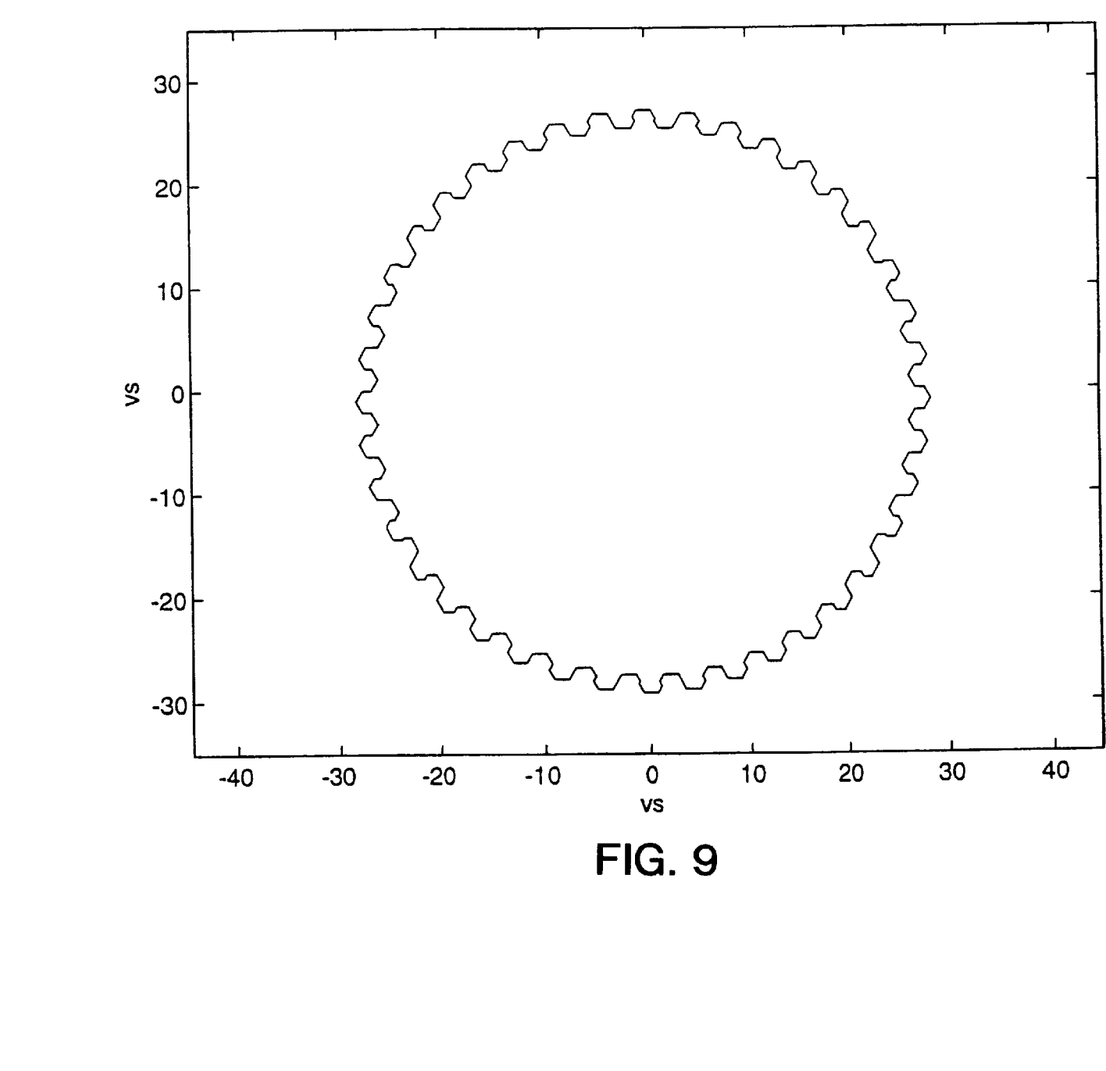
FIG. 9 is a view illustrating the power flow (voltage time area) with the pulse width modulation process according to FIG. 6.

The flow is illustrated in FIG. 9, i.e., the voltage time area achieved during a fundamental oscillation of the reference alternating voltages, in which p is 40.

Figure 10:
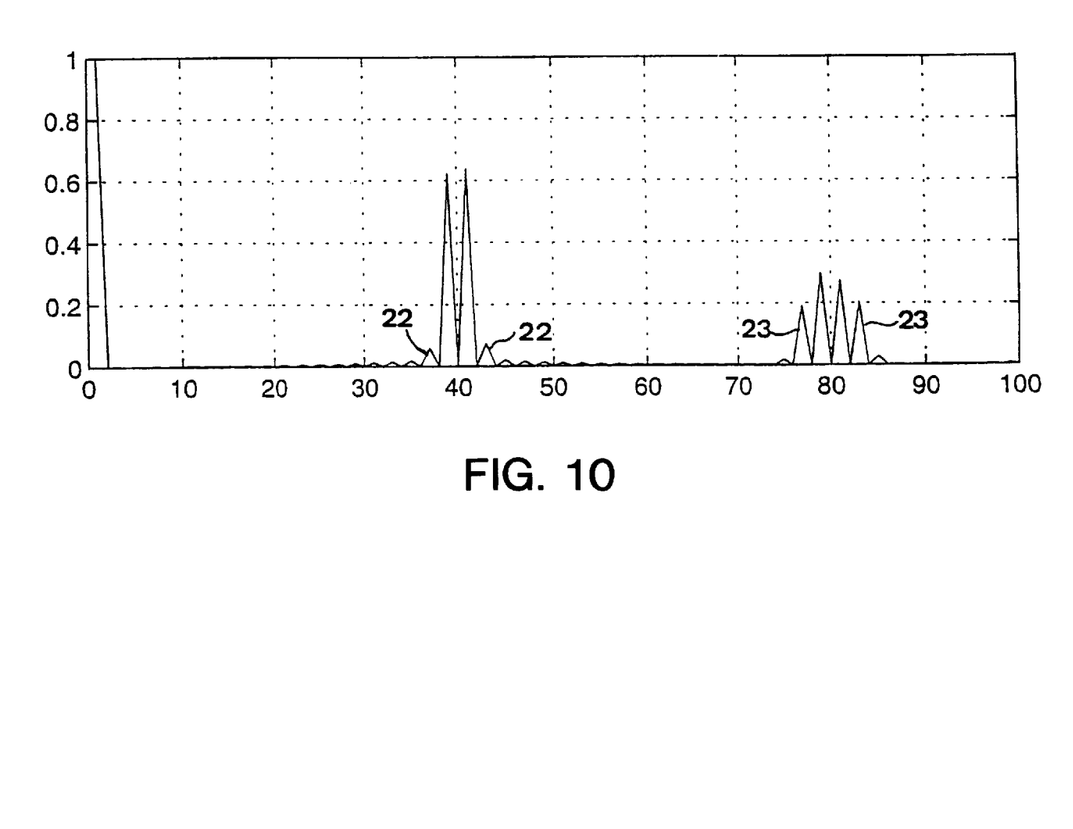
FIG. 10 is a view corresponding to FIG. 5 for the pulse width modulation process according to FIG. 6.

The harmonics formed in the pulse width modulation shown in FIG. 6 are illustrated in FIG. 10, in which the dominating harmonics are:

p−3: zero sequence, p−1: plus sequence, p+1: minus sequence, p+3: zero sequence, 2p−3: zero sequence, 2p−1: minus sequence, 2p+1: plus sequence and 2p+3: zero sequence.

The plus and minus sequence components of the dominating harmonics as compared with the conventional sinusoidal-PWM (see FIG. 5) are higher, which means a somewhat higher filtering requirement for the alternating voltage filters. However, this should not influence the cost of the filters in any substantial degree. The important thing is that the zero sequence components are very small. It appears that the zero sequence components 22 having a low order number are very small, and the dominating zero sequence components 23 are of the order 2p−3 and 2p+3 and have also a comparatively low amplitude. Since the zero sequence current generated is primarily determined by inductive elements (primary the phase inductors 13), a high order number and by that a high frequency means that the resulting zero sequence current will be much lower than for the zero sequences according to FIG. 5.

The invention is of course not in any way restricted to the preferred embodiment described above, but many modifications thereof will be apparent to a man skilled in the art without departing from the basic idea of the invention.

It would for example be possible to use more than two inversions during a fundamental oscillation frequency of the reference alternating voltage, should this be desired.

The invention is discussed above with reference to a digital system, but it also can be implemented in an analog system. A real triangular wave, not only a calculated one, may also be utilized in the invention.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An apparatus for converting direct voltage into three phase alternating voltage comprising:

first, second and third two level converters connected between a source of direct voltage and to a respective phase of a source of three phase alternating voltage having a plurality of electronic switches;

means for controlling each of said electronic switches in response to a specific modulation pattern for each phase; and means for generating each of said specific modulation patterns comprising:

(a) means for generating first, second and third reference alternating frequency signals which have a frequency which is a multiple of a frequency of said source of alternating voltage, and which are displaced in phase with respect to each other;

(b) a triangular wave generator for generating first, second, and third triangular waves of the same frequency which is a multiple of the frequency of said first, second and third reference alternating frequency signals;

(c) means for inverting each triangular wave an even number of times during a cycle of a respective first, second and third reference alternating frequency signals so that two of the triangular waves are inverted one half a period from a third of said triangular waves;

(d) means for comparing each of said triangular waves with a respective of said first, second and third reference alternating frequency signal to determine the amplitude difference between said triangular waves and a respective reference alternating signal; and (e) means for generating first second, and third pulse patterns of negative and positive pulses which represent the time each triangular wave is greater and smaller than a respective reference alternating signal.

2. The apparatus according to claim 1 wherein said means for inverting inverts said triangular waves at substantially constant time intervals.

3. The apparatus according to claim 1 wherein said triangular waves are inverted so that the inversions of said first triangular wave occur at a constant time interval from the inversions of said second triangular wave.

4. The apparatus according to claim 1 wherein said triangular waves are inverted when the direction of voltage increase or decrease of a respective reference alternating voltage changes.

5. The apparatus according to claim 1 wherein said triangular waves are inverted at least two times during a cycle of a respective reference alternating voltage.

6. The apparatus according to claim 1 wherein a respective triangular wave is inverted when the reference alternating voltages for the remaining triangular waves substantially intersect each other.

7. The apparatus according to claim 1 wherein said triangular waves are inverted when the direction of voltage increase or decrease of said triangular waves changes.

8. The apparatus according to claim 1 wherein said alternating reference voltages have a frequency which is at least ten times the frequency of said three phase alternating voltage.

9. The apparatus according to claim 1 wherein said triangular waves have an amplitude which is half the amplitude of the direct voltage.

* * * * *